Patented Mar. 1, 1938

2,110,074

UNITED STATES PATENT OFFICE 2,110,074

WETTING AGENT WITH MILDEW-PROOFING PROPERTIES

Luther Bishop Arnold, Jr., Wilmington, Del., assignor to E. I. du Pont de Nemours & Company, Wilmington, Del., a corporation of Delaware No Drawing. Application July 12, 1935, Serial No. 31,041

10 Claims. (Cl. 167—31)

This invention relates to an improved type of wetting agent with mildew-proofing properties for use in treating textile fibers. More particularly, the invention relates to the preparation of a stable solution of improved wetting properties consisting of a wetting agent, a fungicide which has an assistant action on the wetting agent and water-soluble organic solvents in water. Still more particularly, the invention relates to the preparation of a stable solution of an alkyl naphthalene sodium sulfonate, an orthophenyl phenol derivative and water-soluble organic solvents in water.

This invention has as an object the preparation of a liquid product with the combined properties of a wetting agent and a fungicide wherein the fungicide has a pronounced assistant action on the surface active properties of the wetting agent. A further object is to prepare this product in such a manner that it will be readily dispersible in water and will be stable under normal storage conditions. A still further object is to employ this product for treating textile materials in order to prevent mildew growth thereupon. Other objects will appear hereinafter.

The aforementioned objects of this invention are preferably accomplished by preparing a concentrated solution of an isopropyl naphthalene sodium sulfonate and a sodium salt of an orthophenyl phenol derivative. To this solution is added one or more water-soluble organic solvents and the solution is acidified under controlled conditions.

This invention involves the preparation of a concentrated solution of an isopropyl naphthalene sodium sulfonate wetting agent and a sodium orthophenyl phenate fungicide. To this is added a mixture of ethyl alcohol and ethylene chlorhydrin. The product is then preferably acidified. The purpose of the solvents is to dissolve the water insoluble orthophenyl phenol, which is formed on acidification of the product, and to prevent the precipitation of both the isopropyl naphthalene sodium sulfonate wetting agent, and the orthophenyl phenol fungicide when the product is cooled to 8–10° C.

The preferred method of preparing the product is as follows: 10.0 parts of isopropyl naphthalene sodium sulfonate and 2.5 parts of sodium orthophenyl phenate are dissolved by heating in 71.5 parts of water. To this is added 6.0 parts of ethylene chlorhydrin and 10.0 parts of commercial ethyl alcohol. The mixture is filtered to remove insoluble impurities and acidified to pH 3–6 by the addition of hydrochloric acid. The proper acidity may be determined by making the product acid to methyl red indicator and alkaline to Congo red indicator.

An alternative method is to use orthophenyl phenol instead of sodium orthophenyl phenate. In this case, the isopropyl naphthalene sodium sulfonate is dissolved in water as above, and 2.2 parts of orthophenyl phenol are dissolved in the above mixture of ethyl alcohol and ethylene chlorhydrin. The two solutions are then mixed together, the mixture filtered, and the pH adjusted if necessary.

The product, as formulated above, may be cooled to 8–10° C. without becoming cloudy or separating into layers.

The fungicide, orthophenyl phenol, in the product as formulated above, has a decided assistant action on the sodium isopropyl naphthalene sulfonate wetting agent.

The sodium isopropyl naphthalene sulfonate was found to be 25% more efficient in the presence of 20% of its weight of orthophenyl phenol than alone as determined by the Draves and Clarkson wetting out test (Am. Dyestuff Rep. 20, 201 (1931)). Sodium orthophenyl phenate is of equivalent effectiveness in improving the wetting action of the sodium isopropyl naphthalene sulfonate. Thus, this combination of a wetting agent and a fungicide is unique in that the fungicide has the additional property of assisting the wetting agent. Sodium orthophenyl phenate has no wetting action whatsoever as determined by the Draves and Clarkson test. Other fungicides were found either with relatively very little or without any assistant action on the wetting properties of the sodium isopropyl naphthalene sulfonate. Other fungicides which were investigated included sodium tetrachlor phenate, tetrachlorphenol, sodium chlor-ortho-phenyl phenate, and chlor-ortho-phenyl phenol. They were with very little assistant action on the wetting agent.

The product may also be finished with an alkaline reaction instead of with an acid reaction. This is accomplished by mixing the components, as in the first example above, without acidifying the final mixture. The sodium orthophenyl phenate hydrolyzes to make the product alkaline. The product in this form is not as stable to low temperatures as when prepared by the preferred method, but it is more suitable where an acid product may be harmful to the shade of dyestuffs or to the fiber.

In place of isopropyl naphthalene sodium sulfonate other alkyl naphthalene sulfonic acids and their alkali metal salts may be used. For instance, the employment of butyl naphthalene sulfonic acid and its alkali metal salts, dibutyl naphthalene sulfonic acid and its alkali metal salts, and di-isopropyl naphthalene sulfonic acid and its alkali metal salts is contemplated.

The product of this invention in either of the above final forms is a very effective wetting agent and fungicide when applied to textiles in as low concentrations as 0.5–1.0%. It is particularly effective for wetting out over-dried cotton rawstock after machine dyeing and for conditioning cotton yarn before wet-twisting. The fungicide prevents the growth of mildew on the moistened cotton during storage for long periods of time.

The product is also suitable for wetting out or conditioning any type of textile fiber whether as rawstock, yarn, or fabric, particularly where the moisture is applied by spraying and where it is desirable to protect the textile material temporarily against the growth of mildew. The product is recommended for application by spray at concentrations of 0.5–1.0% in water.

As many apparently widely different embodiments of this invention may be made without widely departing from the spirit and scope thereof, it is to be understood that the invention is not limited to the specific embodiments thereof except as defined in the appended claims.

I claim:

1. A fungicide and wetting agent composition suitable for mildew-proofing organic fibrous materials comprising an aqueous solution containing an alkyl naphthalene sulfonic acid or an alkali metal salt thereof and orthophenyl phenol or an alkali metal phenate derived therefrom.

2. A fungicide and wetting agent composition suitable for mildew-proofing organic fibrous materials comprising an aqueous solution containing an alkyl naphthalene sulfonic acid or an alkali metal salt thereof, orthophenyl phenol or an alkali metal phenate derived therefrom, and a water soluble organic solvent.

3. A fungicide and wetting agent composition suitable for mildew-proofing organic fibrous materials comprising an aqueous solution containing an isopropyl naphthalene sodium sulfonate, orthophenyl phenol or an alkali metal phenate derived therefrom, and a water soluble organic solvent.

4. A fungicide and wetting agent composition suitable for mildew-proofing organic fibrous materials comprising an aqueous solution containing isopropyl naphthalene sodium sulfonate, orthophenyl phenol or an alkali metal phenate derived therefrom, ethylene chlorhydrin, and ethyl alcohol.

5. A fungicide and wetting agent composition suitable for mildew-proofing organic fibrous materials comprising 10 parts of isopropyl naphthalene sodium sulfonate, 2.5 parts of sodium orthophenyl phenate, 71.5 parts of water, 6 parts of ethylene chlorhydrin, and 10 parts of ethyl alcohol adjusted to a pH between 3 and 6.

6. The process of making the composition defined in the preceding claim which comprises dissolving 10 parts of isopropyl naphthalene sodium sulfonate and 2.5 parts of sodium orthophenyl phenate by heating in 71.5 parts of water, adding 6 parts of ethylene chlorhydrin and 10 parts of ethyl alcohol, filtering the mixture to remove insoluble impurities, and acidifying the mixture to obtain a pH between 3 and 6.

7. A fungicide and wetting agent composition suitable for mildew-proofing organic fibrous materials comprising 10 parts of isopropyl naphthalene sodium sulfonate, 2.2 parts of orthophenyl phenol, 71.5 parts of water, 6 parts of ethylene chlorhydrin, and 10 parts of ethyl alcohol.

8. The process of making the composition defined in the preceding claim which comprises dissolving 2.2 parts of orthophenyl phenol in 6 parts of ethylene chlorhydrin and 10 parts of ethyl alcohol, mixing said solution with one containing 10 parts of isopropyl naphthalene sodium sulfonate and 71.5 parts of water, and filtering said mixture.

9. A concentrated aqueous solution suitable for use in the mildew-proofing of organic fibrous materials containing a wetting agent, a fungicide which is not a wetting agent but which has the property of increasing the wetting power of said wetting agent to a marked degree, and sufficient ethylene chlorhydrin to prevent separation of said wetting agent or fungicide from said solution at 10° C., said wetting agent being isopropyl naphthalene sodium sulfonate, and said fungicide being orthophenyl phenol or an alkali metal phenate derived therefrom.

10. Mildew-proof organic fibrous materials containing orthophenyl phenol or an alkali metal phenate derived therefrom and isopropyl naphthalene sodium sulfonate.

LUTHER BISHOP ARNOLD, Jr.